United States Patent [19]

Fairchild et al.

[11] Patent Number: 4,883,935

[45] Date of Patent: Nov. 28, 1989

[54] SEPARABLE RECOMBINABLE MULTI-PART CONTAINER WITH SEPARATELY SEALED CHAMBERS

[76] Inventors: Tim M. Fairchild, 33 East Elm St.; Caroline Laska, 522 N. Darling St.; Gary H. Ward, 418 Vista La., all of Fremont, Mich. 49412

[21] Appl. No.: 228,623

[22] Filed: Aug. 4, 1988

[51] Int. Cl.$^4$ .......................... B65D 71/00; H05B 6/64
[52] U.S. Cl. ..................... 219/10.55 E; 219/10.55 M; 426/120; 426/243; 426/407; 426/113; 220/4 D; 220/23.83; 220/20; 220/359; 206/509
[58] Field of Search ............... 219/10.55 R, 10.55 E, 219/10.55 M; 426/119, 120, 234, 243, 394, 407, 118; 99/DIG. 14, 451; 220/4 B, C, 4 D, 20, 23, 83, 81, 359, 366, 15; 206/497, 501, 508, 509, 568, 821, 223

[56] References Cited

U.S. PATENT DOCUMENTS

| | | |
|---|---|---|
| 2,326,414 | 8/1943 | Thompson . |
| 2,514,573 | 7/1950 | Harrison . |
| 2,899,096 | 8/1959 | Henchert et al. ............... 220/4 D X |
| 3,720,524 | 3/1973 | Nakagami ....................... 426/120 X |
| 3,779,372 | 12/1973 | de Lloret ........................... 220/20 X |
| 3,954,178 | 5/1976 | Mason, Jr. . |
| 3,967,731 | 7/1976 | Boduch . |
| 4,234,097 | 11/1980 | Daenen .............................. 220/4 D |
| 4,248,901 | 2/1981 | Austin .................................. 426/119 |
| 4,311,238 | 1/1982 | Smith .................................. 206/508 |
| 4,333,581 | 6/1982 | Flansburg ............................. 220/20 |
| 4,348,421 | 9/1982 | Sakakibara et al. ................ 426/394 |
| 4,373,633 | 2/1983 | Lutz, Sr. .............................. 206/508 |
| 4,386,109 | 5/1983 | Bower et al. ........................ 426/241 |
| 4,574,174 | 3/1986 | McGonigle ................. 219/10.55 M |
| 4,711,356 | 12/1987 | Dunden ................................ 206/503 |

*Primary Examiner*—A. D. Pellinen
*Assistant Examiner*—David Osborn
*Attorney, Agent, or Firm*—Price, Heneveld, Cooper, DeWitt & Litton

[57] ABSTRACT

A multi-part container for use in a microwave including two sealed compartments for containing complementary foods subjected to different treatment prior to preparation by the consumer. A bottom portion includes a sealed opening defining a first interior region for housing first contents to be subjected to sterilization. An upper part includes a second sealed opening defining a second interior region for housing second contents not benefited from high temperature treatment. The bottom portion and upper part are sealed together to form a single multi-part container. Prior to preparation by the consumer, the first and second interior regions are each opened by the consumer and combined within the interior region of the bottom portion. The upper part is replaced on the bottom portion to form an overcap for the interior region for heating in a microwave.

16 Claims, 1 Drawing Sheet

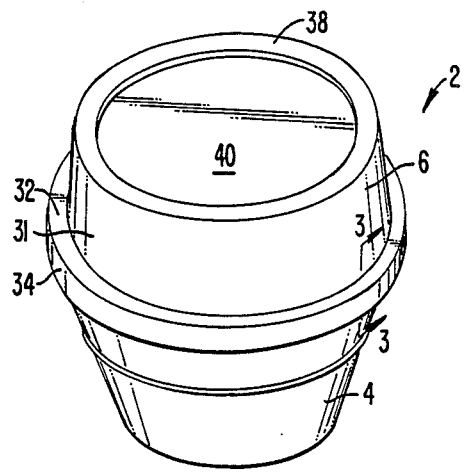
FIG._1.
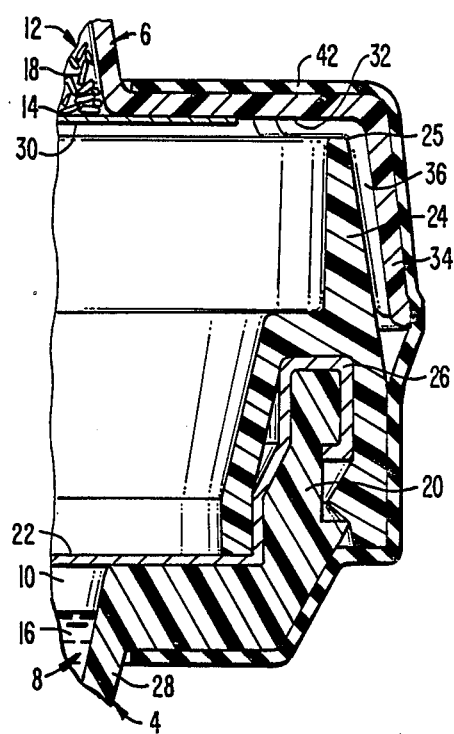
FIG._3.
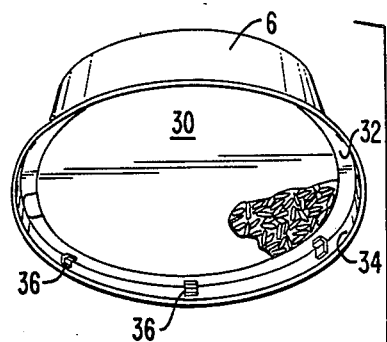
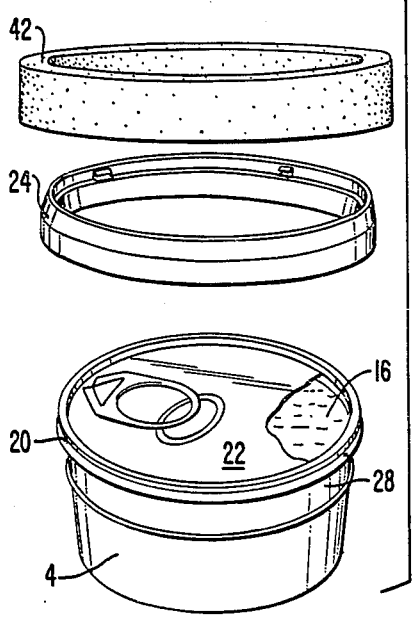
FIG._2.

SEPARABLE RECOMBINABLE MULTI-PART CONTAINER WITH SEPARATELY SEALED CHAMBERS

BACKGROUND OF THE INVENTION

1. Field of the Invention

This invention relates to a multi-part container, particularly for use in a microwave, designed to accommodate complementary ingredients.

Complementary ingredients, such as pasta and sauce, are usable together, but subjected to different treatments prior to packaging. Typically, the ingredients are combined after heating in the microwave. Upon consumption, the complementary ingredients are combined into a single dish; however, because of differing preparation treatments, they must be separately packaged.

2. Description of the Prior Art

Numerous patents, for example, U.S. Pat. Nos. 3,954,178; 3,967,731; 4,311,238; and 4,373,633, disclose stackable container and lid combinations for securing adjacent containers during storage, transportation and display. The configuration of each of these containers provides stability of a vertical stack of containers.

U.S. Pat. No. 4,711,356 discloses stackable containers configured to maximize exposure of the contents to the freezing process.

U.S. Pat. No. 2,514,573 discloses a multiple unit container for containing articles normally provided in sets, such as photographic filters. This container allows opening of any one of several compartments while leaving the remaining compartments closed. Each unit of the set is generally used alone with respect to the remaining units.

U.S. Pat. No. 2,326,414 discloses a series of containers attached together by unions including partitions for closing off the interior of the container from adjoining containers. This patent also discloses an alternate embodiment in which the containers are tubular and provided with no bottoms. When two units of these units are joined together, a single larger container results.

U.S. Pat. No. 4,248,901 discloses two expandable food bags juxtaposed to form a single unitized package. The bags are separated and individually heated in a microwave.

SUMMARY OF THE INVENTION

The present invention is a multi-part container for use in a microwave. The multi-part container includes two separately sealed compartments, sealed together to form a single unit. A bottom portion includes a sealed opening defining a first interior region for housing first contents, for example, chicken, meat, cheese sauce or spaghetti sauce, to be subjected to a specified treatment, preferably, sterilization. A second upper part includes a sealed opening defining a second interior region for housing second contents, for example, rice or pasta, to be combined with the contents of the first interior region. The second contents may be subjected to treatment other than the treatment of the first contents, or none at all. The bottom portion and the upper part are sealed together after treatment of the first contents within the bottom portion.

The first interior region includes a volume sized to contain the first contents. It is configured to simultaneously accommodate both the first and second contents for use in the microwave. The bottom portion preferably includes a seam ring extending the sides of the bottom portion to thereby increase the volume of the first interior region. The upper part comprises an overcap for covering the first interior region containing both the first and second contents.

The bottom portion and upper part are separated from each other and individually opened by the consumer, thereby exposing the contents of the first and second interior regions. After the bottom portion and upper part are opened, the contents are combined within the first interior region. After combination of the first and second contents within the first interior region of the bottom portion, the upper part is replaced onto the bottom portion to serve as an overcap for covering the ingredients during microwaving.

Thus, a single container serves as a separate package and dish for complementary ingredients heated together. Prior to heating in the microwave, a consumer combines both ingredients within one interior region and replaces the other portion above the opening to cover the contents during microwaving.

BRIEF DESCRIPTION OF THE DRAWINGS

FIG. 1 is a perspective view of the present invention.

FIG. 2 is an exploded view of the embodiment of FIG. 1 illustrating, in cutout, first and second contents.

FIG. 3 is a cross-sectional view taken along arrow 3—3 while the cover is positioned on the container.

DETAILED DESCRIPTION OF THE PREFERRED EMBODIMENT

Multi-part container 2 includes a bottom portion 4 and an upper part 6 sealed to the bottom portion. Bottom portion 4 includes a first interior region 8 having a sealed opening 10. Upper part 6 includes a second interior region 12 having a sealed opening 14. Bottom portion 4 and upper part 6 are sealed together such that sealed openings 10, 14 are in face-to-face relation.

Bottom portion 4 includes sides 28 surrounding first interior region 8 and a base (not shown). First interior region 8 houses wet first contents 16, for example, sauce, chicken or meat. An easy-open metal end 22 hermetically seals opening 10 of first interior region 8. Metal end 22 is double-seamed to upper region 20 of bottom portion 4.

A seam ring 24 is snap fit onto upper region 20 of bottom portion 4 after metal end 22 is sealed to the upper region. Seam ring 24 covers metal ring 26 of metal end 22 to prevent arcing in the microwave.

Seam ring 24 is positioned on upper region 20 of bottom portion 4 such that the seam ring vertically extends sides 28, increasing the volume of first interior region 8.

Upper part 6 comprises a generally frustoconical shape and includes opening 14 formed in lower region 31. A lip 32 extends outwardly from opening 14 and a flange 34 extends downwardly from the lip. Vents 36 are located on the interior of downwardly extending flange 34. Vents 36 are shown as ridges, but it is within the scope of the invention to form the vents as having any other configuration. Rim 38 is formed along the outer edge of top surface 40 of upper part 6.

Upper part 6 houses dry second contents 18, such as rice or pasta. Second contents 18 are sealed within second interior region 12 of upper part 6. Foil or paper seal 30 seals opening 14 of upper part 6.

A shrink band 42 comprises a ring sealing upper part 6 to bottom portion 4. Shrink band 42 rests on lip 32, extends outwardly and downwardly surrounding flange 34 and seam ring 24, then inwardly beneath upper region 20 of bottom portion 4.

In use, first contents 16 are hermetically sealed within first interior region 8 of bottom portion 4 by easy-open metal end 22. Sealed bottom portion 4 is thereafter subjected to conventional sterilization techniques. Second contents 18, which would not benefit from sterilization, are packaged within second interior region 12 of upper part 6 via seal 30.

Upper part 6 is inverted such that opening 14 is adjacent opening 10 of bottom portion 4. Shrink band 42 seals upper part 6 to bottom portion 4.

The packaging operation as heretofore described is performed prior to marketing of the product.

A plurality of multi-part containers 2 may be stacked such that bottom portion 4 fits on top surface 40 within rim 38.

A consumer will purchase the product and prepare its contents for consumption as described below.

Shrink band 42 serves as tamper evidence for multi-part container 2. The consumer breaks the seal of shrink band 42 to thereby separate upper part 6 from bottom portion 4. Metal end 22 and seal 30 are opened, exposing first contents 16 and second contents 18. As discussed above, seam ring 24 extends sides 18 of first interior region 8 to simultaneously accommodate both first and second contents 16, 18. Second contents 18 are combined with first contents 16 within first interior region 8 of bottom portion 4. Upper part 6 is replaced onto bottom portion 4 to serve as an overcap for the combined contents. Upper part 6 is supported on seam ring 24 by lip 32; however, it is within the scope of this invention to support upper part 6 directly on bottom portion 4 and to eliminate seam ring 24. Side wall height would be achieved by providing a recessed metal end 22.

The consumer may then heat the combined first and second contents in the container in the microwave.

We claim:

1. A multi-part container for use in a microwave, comprising:
    a bottom portion having an upper sealed opening and defining a first interior region for housing first contents to be subjected to a specified treatment;
    an upper part having a lower sealed second opening and defining a second interior region for second contents, said upper part further being sealed to said bottom portion after treatment of the first contents;
    said upper sealed opening and said lower sealed opening being in face-to-face relationship to each other;
    said bottom portion and said upper part being separable from each other and individually openable at each of said openings, thereby exposing the contents of said first and second interior regions;
    said first interior region being configured to simultaneously accommodate both the first and second contents for use in the microwave.

2. The container as defined in claim 1 wherein the upper part is inverted such that its said lower opening is adjacent said upper opening of said bottom portion when said bottom portion and said upper part are sealed together.

3. The container as defined in claim 1 wherein said specified treatment comprises sterilization.

4. The container as defined in claim 1 wherein said first contents comprises wet contents and wherein said second contents comprises dry contents.

5. The container as defined in claim 1 comprising means for stacking a plurality of multi-part containers.

6. A multi-part container for use in a microwave, comprising:
    a bottom portion having an upper sealed opening and defining a first interior region for housing first contents to be subjected to a specified treatment;
    an upper part having a lower sealed second opening and defining a second interior region for second contents, said upper part further being sealed to said bottom portion after treatment of the first contents;
    said bottom portion and said upper part being separable from each other and individually openable at each of said openings, thereby exposing the contents of said first and second interior regions;
    said first interior region being configured to simultaneously accommodate both the first and second contents for use in the microwave;
    at least a portion of said upper part comprising an overcap for covering said first interior region containing the first and second contents.

7. The container as defined in claim 6 comprising means for retaining said overcap on said bottom portion.

8. A multi-part container for use in a microwave, comprising:
    a bottom portion having an upper sealed opening and defining a first interior region for housing first contents to be subjected to a specified treatment;
    an upper part having a lower sealed second opening and defining a second interior region for second contents, said upper part further being sealed to said bottom portion after treatment of the first contents;
    said bottom portion and said upper part being separable from each other and individually openable at each of said openings, thereby exposing the contents of said first and second interior regions;
    said first interior region being configured to simultaneously accommodate both the first and second contents for use in the microwave;
    said first interior region including a volume sized to contain the first contents and wherein said container further comprises an extension enlarging the volume of said first interior region.

9. The container as defined in claim 8 further including sides defining said first interior region, wherein said extension extends said sides to thereby increase the volume and retain said upper part on said bottom portion.

10. The container as defined in claim 9 wherein said extension comprises a seam ring.

11. A multi-part container for use in a microwave, comprising:
    a bottom portion having an upper sealed opening and defining a first interior region for housing first contents to be subjected to a specified treatment;
    an upper part having a lower sealed second opening and defining a second interior region for second contents, said upper part further being sealed to said bottom portion after treatment of the first contents;
    said bottom portion and said upper part being separable from each other and individually openable at each of said openings, thereby exposing the contents of said first and second interior regions;

said first interior region being configured to simultaneously accommodate both the first and second contents for use in the microwave; and
comprising at least one vent.

12. A method of preparing a microwavable product for consumption by a consumer, the method comprising the steps of:
   (a) sealing a container with first contents to be subjected to a specified treatment;
   (b) subjecting the sealed container to the specified treatment;
   (c) packaging second contents in an upper part;
   (d) sealing the upper part to the container; and
   (e) a consumer preparing the product for consumption including the steps of:
      (i) separating the upper part from the container;
      (ii) opening the sealed container and the sealed upper part to thereby expose the first and second contents;
      (iii) combining the first and second contents in the container;
      (iv) replacing the upper part on the container to cover the combined ingredients; and
      (v) heating the first and second ingredients in the container, in a microwave.

13. An improved multi-part container for use in a microwave including a bottom portion having sides defining a first interior region for housing a first ingredient subjected to a specified treatment and having a metal end sealed over an upper opening of the bottom portion, a seam ring for preventing arcing in the microwave thereby forming a splash guard on the bottom portion, wherein the improvement comprises:
   an upper part including a bowl having a lower opening and defining a second interior region for housing a second ingredient;
   an end sealed over said lower opening causing said second ingredient to be sealed within the bowl; and
   said upper part being sealed to said bottom portion after treatment of the first ingredient;
   said bottom portion and said upper part being separable from each other and individually openable at said openings, thereby exposing said first and second interior regions; and
   said first interior region being configured to receive both the first and second ingredients for use in the microwave.

14. The container as defined in claim 13 wherein said bowl is inverted such that its opening is adjacent the opening of said bottom portion when said bottom portion and said upper part are sealed together.

15. The container as defined in claim 13 wherein at least a portion of said upper part comprises an overcap for covering said bottom portion containing both the first and second ingredients.

16. The container as defined in claim 13 wherein said seam ring extends the sides of the bottom portion, thereby increasing the volume of said first interior region so as to simultaneously accommodate both the first and second ingredients.

* * * * *

UNITED STATES PATENT AND TRADEMARK OFFICE
CERTIFICATE OF CORRECTION

PATENT NO. : 4,883,935
DATED : November 28, 1989
INVENTOR(S) : Tim M. Fairchild et al It is certified that error appears in the above-identified patent and that said Letters Patent is hereby corrected as shown below:

ON TITLE PAGE:
Abstract of the Disclosure, Line 3;

"treatment" should be -- treatments --;

Column 3, Line 26;

"sides 18" should be -- sides 28 --.

Signed and Sealed this

Twenty-seventh Day of August, 1991

Attest:

HARRY F. MANBECK, JR.

Attesting Officer

Commissioner of Patents and Trademarks